Sept. 20, 1938. P. H. WESTERLUND 2,130,438
SEAT SUPPORT
Filed Feb. 8, 1936
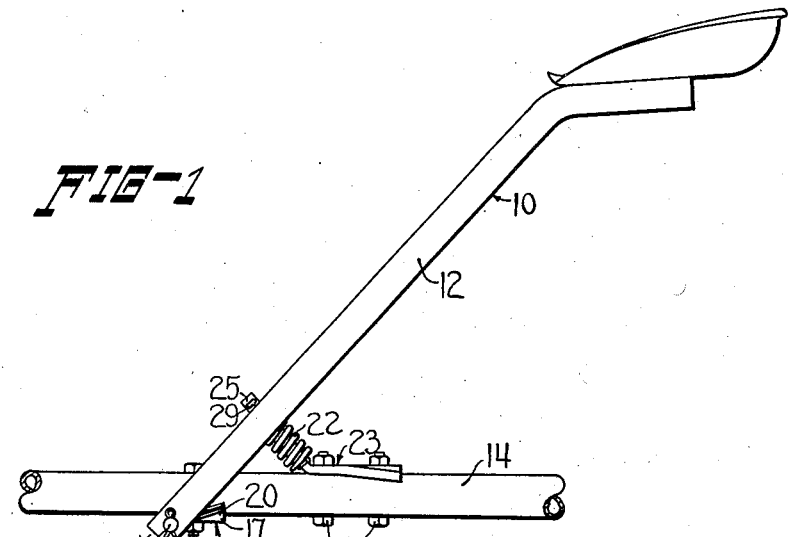
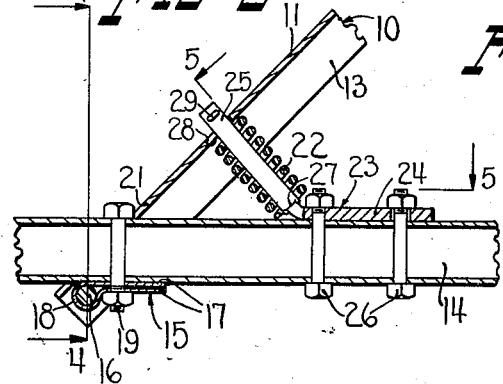
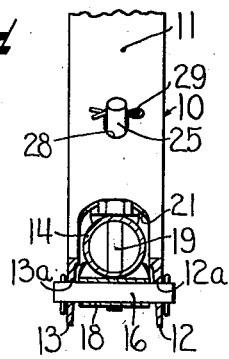
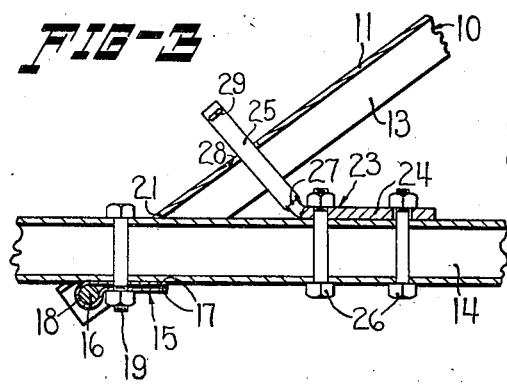
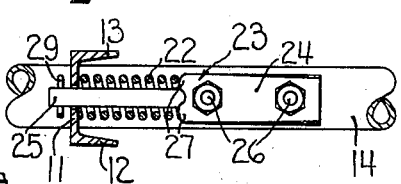
INVENTOR
PAUL H. WESTERLUND.
BY
ATTORNEY Patented Sept. 20, 1938

2,130,438

UNITED STATES PATENT OFFICE 2,130,438

SEAT SUPPORT

Paul H. Westerlund, Moline, Ill., assignor to Deere & Company, Moline, Ill., a corporation of Illinois Application February 8, 1936, Serial No. 62,982

6 Claims. (Cl. 155—51)

The present invention relates to improvements in spring suspended seat supports, and more particularly to seat supports of the type commonly used on agricultural implements wherein the seat support is pivoted on the implement frame and yielding movement is provided for by a spring disposed between the seat support and the frame.

The main object of my invention is to provide a novel seat support inexpensive to manufacture.

In seat supports of this type the spring by which the seat support is suspended may break in case abnormal strain is imposed thereon.

It is another object of this invention, to provide a seat support wherein a limit for the fall of the seat support in case the spring is disabled, is obtained in a novel manner.

Other purposes and advantages will appear in the following description of a preferred embodiment of my invention, reference being had to the accompanying drawing in which:

Figure 1 is a side view of my improved seat support;

Figure 2 is a vertical sectional view showing the seat in a free position;

Figure 3 is a vertical sectional view showing the seat support in its limited downward position;

Figure 4 is a cross-sectional view as seen along line 4—4 of Figure 2; and

Figure 5 is a cross-sectional view as seen along line 5—5 of Figure 2.

In the drawing a seat support 10 comprises a channel iron having a web 11 and legs 12 and 13. Support 10 is pivotally connected to a tubular frame bar 14 of the implement by means of a bracket 15 and a pivot pin 16. The bracket 15 is formed of flat metal stock rebent upon itself to form tongues 17 and a circular bead 18 to receive the pin 16. The bracket 15 is secured to the lower surface of the frame bar 14 by means of a bolt 19 which passes through aligned openings in the tongues 17 and the bar 14. The bracket 15 is firmly seated to the bar 14 by the upturned ends 20 of the tongues 17.

At the lower end of the seat support 10 a recess 21 is provided, by cutting out the web 11 so as to permit the legs 12 and 13 to straddle the frame bar 14. The legs 12 and 13 of the support 10 are provided with holes 12a and 13a through which pin 16 extends.

The seat support 10 is yieldingly held by means of a spring 22 in a position to normally space the end wall of the recess 21 slightly out of abutment with the bar 14. The downward movement of the seat support 10 about the pivot 16 is limited by the end of the recess 21 contacting the bar 14.

Coil spring 22 is loosely supported in a position substantially at right angles to the support 10, by a guide member 23. The guide 23 comprises a base portion 24 and an upwardly extending portion 25. The base portion 24 is secured to bar 14 by bolts 26. The upwardly extending portion 25 is smaller than the base portion 24 thereby forming abutments 27 against which the spring 22 bears. An opening 28 is provided in the web 11 of the seat support 10 through which the upwardly extending portion 25 protrudes. A cotter pin 29 is provided at the end of the portion 25 to limit the upward movement of the seat support 10.

A sudden drop of the seat support 10 due to breakage of the spring 22 will be quickly checked before the operator is thrown from the seat by reason of the end wall of the recess 21 contacting the upper surface of bar 14.

What I claim is:

1. In combination, a vehicle frame having a bar, a seat support having a recess at its lower end defining legs straddling said bar, means including a bracket fixed to the lower surface of said bar for pivotally connecting the lower end of said legs to said bar, a spring guide secured upon the upper side of said bar, said guide extending upwardly through a hole provided in said support, and a spring embracing said guide and bearing against the lower side of said support.

2. In combination with a vehicle frame having a bar, of a seat support comprising a channel member having side members and a connecting web and having a recess in the web at the lower end thereof, whereby said side members at the lower end define legs straddling said bar, means pivotally connecting the lower end of said legs to said bar, and means yieldingly holding said seat support in an inclined position comprising a compression spring and a guide about which said spring is disposed, said guide being fixed to said bar below said seat support and having a portion extending substantially at right angles to said seat support, the upper end of said spring bearing against the lower face of the web of said support.

3. In combination with a vehicle frame having a bar, of a seat support comprising a channel member having side members and a connecting web and having a recess in the web at the lower end thereof, whereby said side members at the lower end define legs straddling said bar, means pivotally connecting the lower end of said legs to said bar, and means yieldingly holding said seat support in an inclined position comprising a compression spring and a guide about which said spring is disposed, said guide being fixed to said bar below said seat support and having a portion extending substantially at right angles to said seat support, and extending through a hole provided in the web of said support, the upper end of said spring bearing against the lower face of the web of said support, and means carried by the end of said guide projecting through said hole for limiting the swinging movement of said support under the influence of said spring.

4. In combination with a vehicle frame including a bar, a seat support having a recess at one end defining legs straddling said bar, means including a bracket fixed to the side of said bar opposite to said support for pivotally connecting the ends of said legs to said bar, a spring guide secured to said bar, said guide extending through a hole provided in said support, and a spring embracing said guide and bearing against said support.

5. In combination with a frame bar, a seat support comprising a structural member disposed diagonally with respect to said frame bar, said member having a laterally extending web portion overlying said bar and terminating adjacent to the surface of the bar, and a vertical flange portion disposed at the side of said web portion and extending beyond the termination thereof in juxtaposition with the side of said bar and pivotally connected to said bar on an axis spaced longitudinally on said member from the termination of said web portion, and means for yieldingly holding said support in a normal position with the terminating edge of said web portion spaced from said bar, the terminating edge of said web portion being positioned to limit the amplitude of oscillation of said support about its pivotal connection to a predetermined safe value by engaging the adjacent surface of said bar when said safe value is exceeded.

6. In combination with a frame bar, a seat support comprising a structural channel member having a laterally extending web portion overlying said bar and terminating adjacent to the surface of the bar, and a vertical flange portion at either side of said web portion and extending beyond the termination thereof defining legs straddling said bar, means for pivotally connecting said legs to said bar on an axis spaced longitudinally of said channel member from the terminating edge of said web portion, and spring means disposed to act between said support and said bar for yieldingly holding said support in a normal position with the terminating edge of said web portion spaced from said bar, the terminating edge of said web portion being positioned to limit the amplitude of oscillation of said support about its pivotal connection to a predetermined safe value by engaging the adjacent surface of said bar when said safe value is exceeded or in case the spring breaks.

PAUL H. WESTERLUND.